United States Patent [19]
Davis
[11] 3,731,301
[45] May 1, 1973

[54] METHODS OF DETECTING ROTATION SPEED

[75] Inventor: John Christopher Hammond Davis, Taplow, England
[73] Assignee: Plessey Handel Und Investments A.G., Zug, Switzerland

[22] Filed: July 6, 1971
[21] Appl. No.: 159,890

[52] U.S. Cl. ...............340/347 P, 318/311, 318/313, 340/263, 340/271
[51] Int. Cl. ...............G08c 9/06
[58] Field of Search...............318/318, 327, 311, 318/312–315; 340/263, 271, 347 P; 235/150.2, 150.21; 324/175; 73/506, 518

[56] References Cited

UNITED STATES PATENTS

| | | | |
|---|---|---|---|
| 3,514,679 | 5/1970 | Larsen | 318/313 X |
| 3,210,658 | 10/1965 | Stevens | 340/271 X |
| 3,242,478 | 3/1966 | Kaestner | 340/347 P |
| 3,370,289 | 2/1968 | Hedgcock et al. | 340/271 X |

*Primary Examiner*—Maynard R. Wilbur
*Assistant Examiner*—Leo H. Boudreau
*Attorney*—Irvin D. Thompson and Robert J. Patch

[57] ABSTRACT

Apparatus, preferably fluidic, for providing a control signal indicative of any deviation of the speed of movement of a jet engine or other moving object from a desired speed, comprising a code disc rotated at a speed proportional to the speed of rotation of the jet engine, logic means which cyclically samples the tracks on the code disc at equal time intervals and produces an output signal if the difference between two successive samples is more than a predetermined amount, and integration means which receives and integrates said output signals to provide said control signal. The control signal may be applied to a valve controlling the supply of fuel to the engine so as to govern the engine speed.

15 Claims, 3 Drawing Figures

METHODS OF DETECTING ROTATION SPEED

FIELD OF THE INVENTION

This invention relates to apparatus for providing a control signal indicative of any deviation of the speed of movement of a moving object from a desired speed. The invention may be embodied in fluidic digital apparatus for use in a governor such as a droop governor for controlling the speed of rotation of a jet engine.

Digital methods of measuring and governing rotation speeds using electronic counting techniques are well known. However, where high accuracy is required in the region of ± 0.5 to 0.1 percent and fast response involving delays of 50 milliseconds or less in the detection system, the analogous fluidic systems are too slow using the usual counting methods.

One method of overcoming this difficulty would be to sample a coding disc at, for example, 32 millisecond intervals. The code of the coding disc would normally be a Gray code which must be translated to natural binary and then stored. The next sample is also stored and subtracted from the preceding one. The resulting difference code is a measure of the angle turned by the disc during the sampling interval and therefore of the rotation speed of the shaft on which the disc is mounted. This code can therefore be used in the same way as the output of a counter in the known method. However, this method is even more complex than the counter method.

SUMMARY OF THE INVENTION

According to the present invention, there is provided apparatus for providing a control signal indicative of any deviation of the speed of movement of a moving object from a desired speed, the apparatus comprising a code disc having a plurality of code tracks thereon and arranged to be rotated at a speed proportional to the speed of movement of the object, storage means connected to monitor each of said code tracks, signal generation means connected to said storage means to supply thereto a series of equally spaced signals each of which is operative to cause the storage means to sample and store the instantaneous values of said code tracks to indicate the instantaneous position of said disc, logic means connected to said storage means and arranged to compare each successive pair of samples of said code tracks with each other and to produce an output signal for every such pair of successive samples that differ by more than a predetermined amount, and integration means connected to said logic means so as to receive and integrate any of said output signals produced to provide said control signal.

In two embodiments of the invention described below said logic means is arranged to produce a first output signal if the difference between two successive samples is more than said predetermined amount and a second and different output signal if such difference is less than said predetermined amount. Said storage means comprises two stores each arranged to store a respective one of two successive samples and said logic means comprises a subtract circuit arranged to compare the contents of the two stores and to produce a first or second output signal in response to a difference in the two contents. In one of said embodiments the integration means includes a reversible counter and a counter store and in the other embodiment, wherein the first and second output signals are of equal amplitudes and opposite polarities, the integration means is a "leaky"integrator, i.e., a resistive-capacitative integrator circuit.

In another embodiment of the invention the storage means comprises, for each track on the code disc, a bistable sampling circuit arranged to take up a first or a second state, respectively, when a sample of the associated track has one or the other value, and the logic means comprises, for each said bistable sampling circuit a coincidence detector having two inputs each connected to a respective one of the outputs of the associated bistable sampling circuit and arranged to produce an output whenever consecutive states of both outputs of the bistable circuit are not the same, and a gate connected to receive the outputs of all the coincidence detectors, any output signal of such gate comprising said output signal of the logic means.

By employing this invention, a code employing a relatively small number of bits can be sampled at relatively short intervals and the necessary accuracy is built up by the integration means adding up the sub-totals obtained from each sample during a longer time interval to give an accuracy equivalent to a code employing a larger number of bits sampled at this larger interval.

BRIEF DESCRIPTION OF THE DRAWING

The invention will be more readily understood from the following description given with reference to the accompanying drawing in which FIGS. 1, 2 and 3 each illustrate in schematic form a respective embodiment of the invention. In all three embodiments, a three-bit code is sampled at 2 millisecond intervals and the subtotals are integrated or added up over 32 milliseconds to give an accuracy equivalent to a seven-bit code sampled at 32 millisecond intervals.

DETAILED DESCRIPTION OF THE PREFERRED EMBODIMENTS

Figures 1, 2, 3:
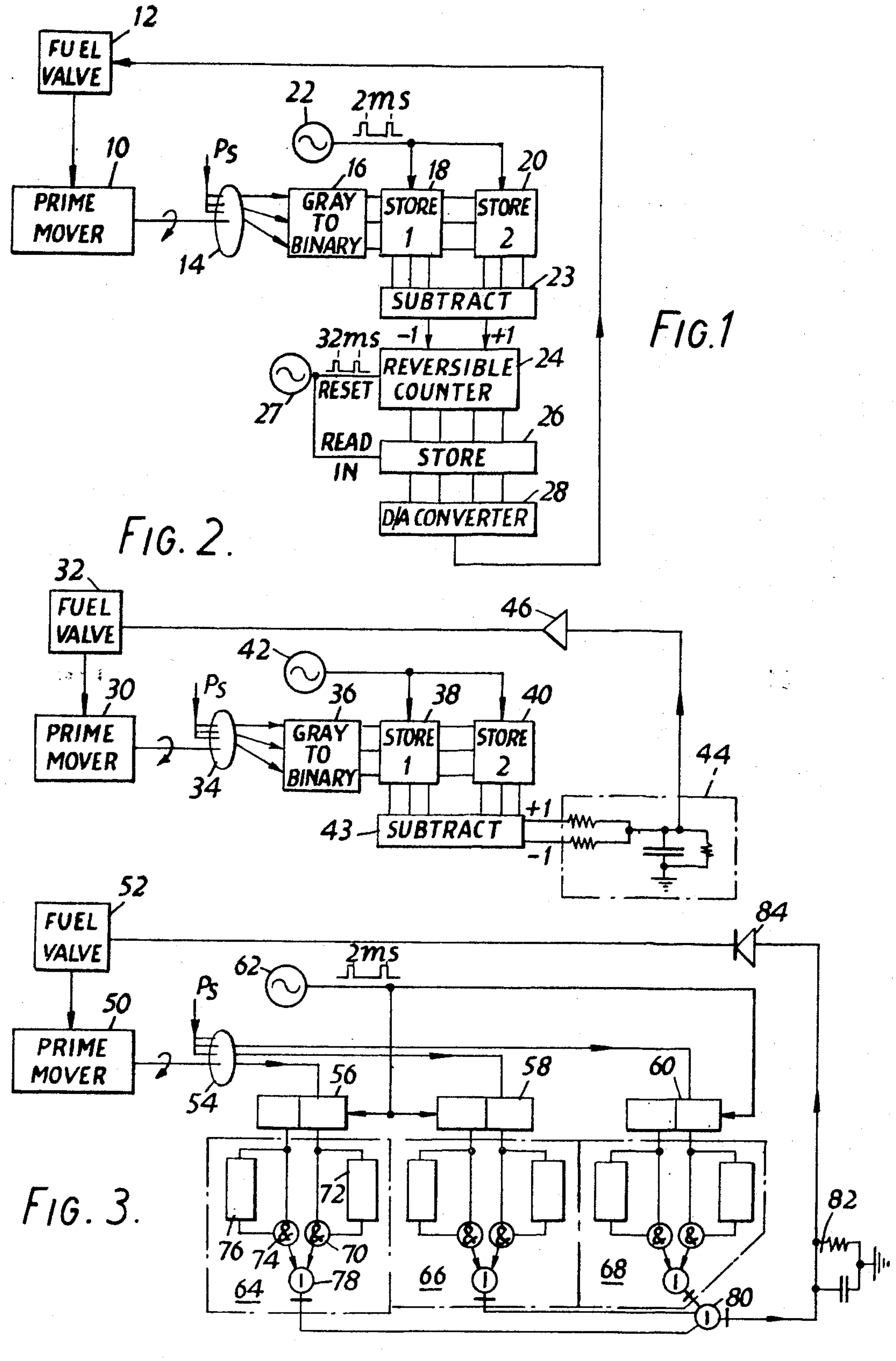

Referring to FIG. 1, the supply of fuel to a prime mover, such as a jet engine 10, is controlled by a fuel valve 12. A code disc 14 having a three-bit Gray code thereon, is mounted on the shaft of the prime mover 10. The code disc 14 is suitable for sampling by fluidic signals and the output therefrom is connected to a fluidic Gray-to-binary converter 16. The output from the Gray-to-binary converter is connected to a first store 18 which has an output connected to a second store 20. The stores 18 and 20 are arranged to sample and store the signals at their inputs when sampling pulses are applied thereto from a pulse generator 22 which produces pulses at 2 millisecond intervals.

Outputs from the stores 18 and 20 are connected to the respective inputs of a subtract circuit 23 which is arranged to produce a −1 output on each occasion when the difference between the content of store 18 and that of store 20 is 5 and a +1 output pulse on each occasion when the difference between the content of store 18 and that of store 20 is 7. When a true arithmetical subtraction would give a negative answer, the subtract circuit adds 8 to the answer (equivalent to one complete revolution of the code disc).

The +1 and −1 pulses are supplied to respective inputs of a reversible counter 24. The output of the reversible counter 24 is connected to a store 26 which is arranged to sample and store its input in response to the leading edge of a pulse from a pulse generator 27 which is arranged to generate pulses at 32 millisecond intervals. The reversible counter 24 is arranged to be reset to zero in response to the trailing edges of the same pulses from the pulse generator 27. Thus, the number stored in the store 26 is the algebraic sum of the output pulses from the subtract circuit 23 over a 32 millisecond time interval. The output from the store 26 is connected to a digital-to-analogue converter 28 which supplies an analogue signal for controlling the fuel valve 12.

The embodiment of FIG. 1 operates as follows. Assume for example that, when the prime mover 10 is running at the required speed, the difference between successive samples received from the Gray-to-binary converter 16 is always exactly 6. Thus, receipt of a 7 means "too fast" and receipt of a 5 means "too slow." The subtract circuit is arranged to generate a +1 pulse for "too fast" and a −1 pulse for "too slow." Thus, since the counter 24 is reset every 32 milliseconds, the maximum number of pulses it is required to store is + or −16, corresponding to a speed range of five sixths to seven sixths of the set speed.

The governed speed of the prime mover 10 can be varied over a limited range without undue difficulty. One method of doing this is to inject a predetermined number of pulses into the up or down input of the reversible counter 24 during the course of each sampling period. Alternatively, the reversible counter may be arranged to be reset to a number other than zero. A simpler but less accurate arrangement is to introduce an analogue bias at the output of the digital-to-analogue converter 28.

If an integral output is required, the output from the store 26 may itself be applied to a reversible counter which is only reset at long intervals or after transient overloads. A differential output may be obtained by storing the counter output and subtracting the stored output from a subsequent output to find the change. Integration and differentiation can also be performed on the analogue output from the converter 28 if desired.

It will be appreciated that the reversible counter 24 is the digital equivalent of a "leaky" integrator, i.e. a resistive-capacitative integrator circuit. An alternative system, using an analogue "leaky"integrator, is illustrated in FIG. 2. Once again, a prime mover 30 having its fuel supply controlled by a valve 32, has a Gray code disc 34 mounted on its shaft. The output from sampling the Gray code disc is applied to a Gray-to-binary converter 36 whose output is connected to the first of a pair of coupled stores 38 and 40. The stores 38 and 40 operate in the same way as the stores 18 and 20 in FIG. 1, receiving sampling pulses at 2 millisecond intervals from a pulse generator 42. As before, the outputs of the stores 38 and 40 are applied to a subtract circuit 43 which produces +1 and −1 pulses in the same way as the subtract circuit 22 of FIG. 1. However, instead of being fed to a reversible counter, the +1 and −1 pulses are fed directly to a leaky integrator 44, the output of which is fed via an amplifier 46 to control the fuel valve 32. The time constant of the leaky integrator 44 is chosen so that this embodiment, like that of FIG. 1, integrates over 16 2 millisecond samples of the three-bit code on the code disc 34.

FIG. 3 illustrates an alternative embodiment in which the digital circuits operate directly on the Gray code thereby avoiding the necessity of providing a Gray-to-binary converter. In FIG. 3, the fuel supply to a prime mover 50 is controlled by a fuel valve 52. The prime mover 50 has a Gray code disc 54 mounted on its output shaft. As before, the Gray code disc has a three-bit code thereon.

Instead of connecting all three bit outputs from the sensing means for the Gray code disc to a Gray-to-binary converter each bit output is connected to a respective bistable sampling circuit 56, 58, 60 arranged to take up a first state when the respective output from the code disc is a 1 and a second state when the respective output is a 0. The sampling circuits 56, 58 and 60 are supplied with timing pulses at 2 millisecond intervals from a pulse generator 62.

The output from each sampling circuit 56, 58 and 60 is connected to a respective coincidence detector 64, 66, 68. The three coincidence detectors 64, 66 and 68 are identical. The detector 64 will be described by way of example. The 1 output of the sampling circuit 56 is connected to one input of an AND gate 70 directly and to the other input thereof via a delay device 72 which is arranged to impose a delay of 2 milliseconds, equal to the time interval between successive sampling pulses from the generator 62. Similarly, the 0 output of the sampling circuit 56 is connected to one input of an AND gate 74 directly and to the other input thereof via a delay device 76 arranged to impose a delay of two milliseconds. Thus, the AND gate 70 produces an output pulse whenever two successive 1's are received and the AND gate 74 produces an output pulse when two successive 0's are received. The outputs of AND gates 70 and 74 are connected to respective inputs of a NOR gate 78 which therefore produces an output signal except at instants when pulses are received from the AND gate 70 or the AND gate 74 indicating receipt of consecutive 1's or consecutive 0's respectively. The output of the NOR gate 78 is the output of the coincidence detector 64.

Similarly the coincidence detectors 66 and 68 are arranged to produce outputs except when their respective sampling circuits 58 and 60 detect that successive ones or successive noughts are being received. The outputs from the three coincidence detectors 64, 66 and 68 are connected to a NOR gate 80, the output of which is applied to a "leaky" integrator 82. The time constant of the "leaky"integrator 82 is chosen so that this embodiment, like those of FIGS. 1 and 2, integrates over 16 2 millisecond samples of the three-bit code on the code disc 54. The output of the integrator 82 is supplied via an amplifier 84 to control the setting of the fuel valve 52.

The system is so arranged that when the prime mover 50 is running at the desired speed, the code disc 54 completes slightly more than seven eighths of a complete revolution per 2 millisecond sampling period. If the code disc 54 does not make a complete revolution per sampling period, outputs are supplied from the three coincidence detectors 64, 66 and 68 to the NOR gate 80 so that no output is produced therefrom. On the other hand, if the code disc 54 makes a complete revolution between sampling periods, coincidence will be detected by all three detectors 64, 66 and 68 which will therefore produce outputs for short periods (preferably 2 milliseconds) determined by the widths of the pulses produced by the delay circuit such as the circuits 72 and 76. Consequently, the NOR GATE 80 produces an output pulse of this width. The pulses from the NOR gate 80 are smoothed by the circuit 82 and applied to the amplifier 84. The amplifier 84 is an inverting amplifier and consequently increasing the input thereof decreases the output so that the control signal to the fuel valve 52 decreases and the flow of fuel is reduced. This, of course, reduces the speed of the prime mover 50 so that the code disc 54 no longer makes a complete revolution per sampling period so that coincidence is no longer detected. The prime mover stabilizes at a speed slightly greater than seven eighths of a revolution per sample, the precise speed depending on the loop gain.

It will be realized that, as a speed of nine eighths of a revolution per sample is approached, the pulse rate from the NOR gate 80 again drops to zero. Thus, a transient overspeed of this magnitude could produce runaway. However, such a large transient overspeed is not normally allowed to occur. There is also a spurious working band between nought and one eighth of a revolution per sample. However, most prime movers will not work stably at one seventh of normal working speed so that this speed range will occur only during the start up when a special override can be introduced. Alternatively, the fuel valve 52 can be so arranged that, even when no signal is received from the amplifier 84, it gives sufficient fuel for the prime mover to reach one seventh of normal working speed.

Although the embodiment of FIG. 3 has been described as employing the Gray code, any other code may readily be employed with this embodiment.

Although the embodiments described above are of a fluidic form, the invention may also be embodied in electronic or other forms, as will be evident to those skilled in the art. The invention is particularly suitable for fluidic application as it provides a solution to the speed limitations in known fluidic systems referred to hereinabove, but it can also be used in electronic or other control systems to speed up response and, possibly, to simplify the systems.

The above-described embodiments of the invention develop a control signal for fuel valve controlling the speed of rotation of a jet engine. The prime mover can be of a different type, which may be powered by some other powering medium than a fuel, and need not be controlled via a fuel valve. For instance, apparatus embodying this invention may be arranged to provide a signal for application to a valve controlling the supply of steam to a prime mover such as a steam turbine. Further, the invention may be used to control translational as well as rotational speeds.

I claim:

1. Apparatus for providing a control signal indicative of any deviation of the speed of movement of a moving object from a desired speed, the apparatus comprising a code disc having a plurality of code tracks thereon and arranged to be rotated at a speed proportional to the speed of movement of the object, storage means connected to monitor each of said code tracks, signal generation means connected to said storage means to supply thereto a series of equally spaced signals each of which is operative to cause the storage means to sample and store the instantaneous values of said code tracks to indicate the instantaneous position of said disc, logic means connected to said storage means and arranged to compare each successive pair of samples of said code tracks with each other and to produce an output signal for every such pair of successive samples that differ by more than a predetermined amount, and integration means connected to said logic means so as to receive and integrate any of said output signals produced to provide said control signal.

2. Apparatus as claimed in claim 1, wherein said logic means is arranged to produce a first output signal if any two successive samples differ by more than said predetermined amount and a second and different output signal if such difference is less than said predetermined amount.

3. Apparatus as claimed in claim 2, wherein said storage means comprises two stores each arranged to store a respective one of two successive samples and said logic means comprises a subtract circuit arranged to compare the contents of the two stores and to produce a first or second output signal in response to a difference in the two contents.

4. Apparatus as claimed in claim 3, wherein the integration means comprises a reversible counter having an input for counting in one direction connected to said subtract circuit so as to receive any of said first output signals and an input for counting in the opposite direction connected to said subtract circuit so as to receive any of said second output signals, a counter store connected to the reversible counter and means for resetting the counter and for entering its contents into the counter store after a predetermined number of samples, whereby the contents of the counter store represent the difference between the numbers of first and second output signals produced by said predetermined number of samples.

5. Apparatus as claimed in claim 4, including a digital-to-analogue converter connected to receive the contents of the counter store and the output of the converter comprises said control signal.

6. Apparatus as claimed in claim 3, wherein said subtract circuit is adapted to provide first and second output signals of equal amplitudes and opposite polarities, and wherein the integration means is a resistive-capacitative integrator circuit.

7. Apparatus as claimed in claim 1, wherein the tracks on the code disc are arranged to form a Gray code and wherein a Gray-to-binary converter connects said code tracks to said storage means.

8. Apparatus as claimed in claim 1, wherein the storage means comprises, for each track of the code disc, a bistable sampling circuit arranged on receipt of each signal from said signal generation means to take up a first or or a state, respectively, according to whether the associated track has one or the other value, and the logic means comprises a respective coincidence detector connected to each of said bistable sampling circuits and each having two inputs each connected to a respective one of the outputs of the associated bistable sampling circuit and arranged to produce an output whenever consecutive states of both outputs of the bistable circuit are not the same, and a gate connected to receive the outputs of all the coincidence detectors, any output signal of such gate comprising said output signal of the logic means.

9. Apparatus as claimed in claim 8, wherein each coincidence detector comprises a pair of AND gates each having one input connected directly to a respective one of the outputs of the associated bistable sampling circuit and another input connected to the same output through a delay circuit, and a NOR gate connected to receive the outputs of the AND gates, the output of the NOR gate being the output of the coincidence detector.

10. Apparatus as claimed in claim 9, wherein the delay period of each of the delay circuits is equal to the time interval between successive signals provided by said signal generation means.

11. Apparatus as claimed in claim 8, wherein the integration means comprises a resistive-capacitative integrator circuit.

12. Apparatus as claimed in claim 1, wherein there are three tracks on the code disc.

13. Apparatus as claimed in claim 1, including means for adjustably offsetting said control signal to afford variation of said desired speed.

14. Apparatus for governing the speed of movement of an object, e.g. a prime mover, comprising apparatus as claimed in claim 1 and means for varying the speed of movement of the object, said control signal being operative on said means for varying the speed of the object in a sense tending to minimize any deviation of the speed of movement of the object from the desired speed.

15. Apparatus as claimed in claim 14, wherein said means for varying said speed of movement comprises a valve which is operative to vary the rate at which a powering medium is supplied to the prime mover.

* * * * *